Patented Jan. 10, 1933

1,893,556

UNITED STATES PATENT OFFICE

HERBERT KRACKER AND ERWIN THOMA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

AZO DYESTUFFS AND MATERIAL DYED WITH THEM

No Drawing. Application filed November 3, 1928, Serial No. 317,113, and in Germany November 12, 1927.

The present invention relates to new azo dyestuffs and material dyed with them.

We have found that azo dyestuffs of excellent fastness, especially of a very good fastness to kier-boiling, to chlorine and of a fastness to light which answers the highest requirements, are obtained by diazotizing a halogen substitution-product of 1-amino-3.5-dimethyl-benzene of the following formula:

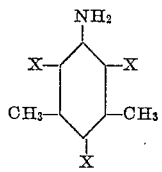

wherein at least one X stands for halogen and the others represent hydrogen or halogen, and coupling it with a carboxylic acid aryl amine of the following formula

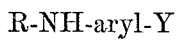

R-NH-aryl-Y wherein R stands for the residue of the 2-hydroxynaphthalene-3-carboxylic acid or of a β-ketocarboxylic acid, aryl stands for any aryl residue, which may be substituted or not, and Y stands for hydrogen or any substituent or for the residue -NH-R.

The said dyestuffs may be produced in the usual manner on the fiber, in substance or on a substratum.

The following examples serve to illustrate our invention, but they are not intended to limit it thereto.

In all of the examples regarding the dyeing process there are treated 50 grammes of well boiled cotton yarn for ½ hour with the grounding liquor (a), whereupon the material is wrung out, well freed from water by hydro-extraction and dyed for ½ hour in the developing bath (b). The dyed yarn is then well rinsed several times, soaped at the boil and again rinsed.

(1) 2.00 parts by weight of 1.3-dimethyl-5-amino-2-bromo-benzene are diazotized with 2.6 parts by volume of hydrochloric acid of 22° Bé., some water and 0.72 parts by weight of sodium nitrite at 0° C.-5° C. After the diazotization is complete, the whole is neutralized with 2 parts by weight of sodium acetate. A paste is then prepared from 2.93 parts by weight of 2.3-hydroxynaphthoic acid-4'-methoxy-1'-anilide, 9 parts by volume of sodium Turkey red oil of 50% strength and 10 parts by volume of caustic soda solution of 34° Bé. and this paste is dissolved by adding hot water and, if required, boiling. This solution, after being cooled and if necessary, filtrated, is run into the acetic diazo solution obtained as above indicated. After a short time, the copulation is complete. The resulting dyestuff is precipitated and may be obtained by filtering it off. It forms a paste of a vivid, bluish-red tint possessing very good fastness to light. The dyestuff has the following constitution:

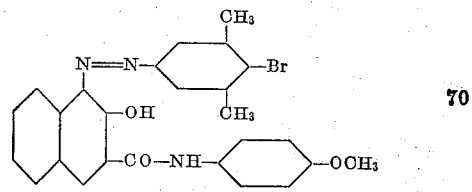

(2) (a) The grounding liquor is prepared as follows: A paste is made from 4.5 grammes of 2.3-hydroxynaphthoic acid-4'-chloro-2'-methoxy-1'-anilide, 9 ccm. of sodium Turkey red oil of 50% strength and 11.5 ccm. of caustic soda solution and this paste is dissolved by adding 1 liter of hot water, and, if necessary, boiling. Finally 4.5 ccm. of a solution of formaldehyde of 30% strength are added thereto.

(b) The developing bath is prepared as follows: 1.93 grammes of 1.3-dimethyl-5-amino-4-chlorobenbene hydrochloride are diazotized at 0° C.-5° C. with 1.6 ccm. of hydrochloric acid of 22° Bé., 0.72 grammes of dissolved sodium nitrite and 1 liter of water. After the diazotization is complete, the whole is neutralized with 2 grammes of dissolved sodium acetate so as to become neutral to Congo red paper. In this manner a vivid scarlet red tint of very good fastness to kier-boiling and an excellent fastness to chlorine and to light is obtained. The dyestuff has the following constitution:

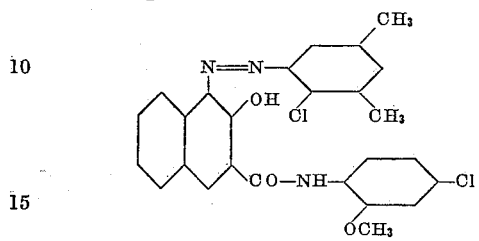

(3) (a) The grounding liquor is prepared as follows: A paste is made from 3.6 grammes of diacetoacetic-3.3'-dimethyl-diphenyl-4.4'-diamide, 7.2 ccm of sodium Turkey red oil of 50% strength and 7.2 ccm. of caustic soda solution of 34° Bé. and this paste is dissolved by adding 1 liter of boiling water and further adding 28 grammes of crystallized sodium sulfate.

(b) The developing bath is prepared as follows: 1.56 grammes of 1.3-dimethyl-5-amino-4-chlorobenzene hydrochloride are diazotized at 0° C.–5° C. with 1.6 ccm. of hydrochloric acid of 22° Bé., 1 liter of water and 0.72 grammes of sodium nitrite, and the mineral acid is then neutralized with a solution of 2 grammes of sodium acetate. There is obtained a vivid, reddish-yellow dyeing of very good fastness to kier-boiling, to chlorine and to light. The dyestuff has the following probable formula:

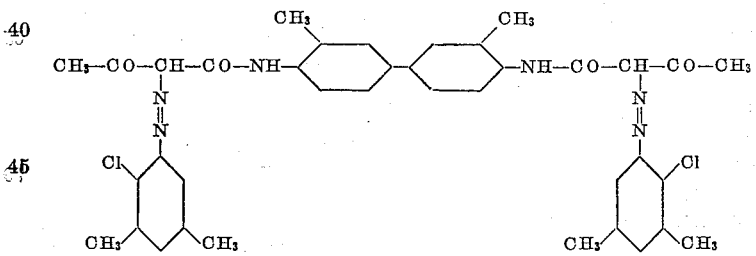

(4) (a) The grounding liquor is prepared as follows: A paste is made from 4.5 grammes of 2.3-hydroxynaphthoic acid-5'-chloro-2'-methoxy-1'-anilide, 9 ccm. of sodium Turkey red oil of 50% strength and 9 ccm. of caustic soda solution of 34° Bé. and this paste is dissolved with 1 liter of water while boiling. Finally 4.5 ccm. of a solution of formaldehyde of 30% strength are added.

(b) The developing bath is prepared as follows: 1.9 grammes of 1.3-dimethyl-5-amino-2.4-dichlorobenzene are triturated with 4.25 ccm. of hydrochloric acid of 22° Bé., some water and ice are then added and the whole is diazotized at 0° C.–5° C. with a solution of 0.72 grammes of sodium nitrite. The mass is made up with water to 1 liter, the hydrochloric acid is neutralized with 2 grammes of sodium acetate and the final product is rendered neutral to litmus paper by adding 1.6 grammes of sodium bicarbonate. There is obtained a vivid scarlet red dyeing of good fastness to kier-boiling and chlorine and of an excellent fastness to light. The dyestuff has the following formula:

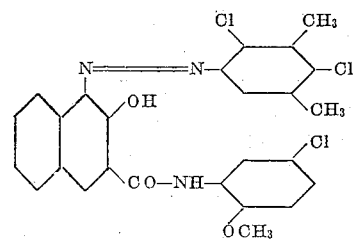

By using as coupling component a corresponding quantity of another arylamide of the 2.3-hydroxynaphthoic acid or of the acetoacetic acid, and as diazotizing base another halogenated derivative of the 5-amino-1.3-dimethylbenzene, there are obtained dyestuffs possessing similarly excellent properties as those mentioned in the foregoing examples, their shades generally ranging from yellow to brownish-red and yellowish-red and thence to bluish-red.

The following table illustrates a number of the dyestuffs obtained according to the examples, but is not to be understood as limiting the possibility to obtain similar dyestuffs of equally good fastness properties by some other combinations of the base and the coupling component, than those included in the table.

| Diazotizing base | Coupled with | Shade of the dyeing produced on the fiber |
|---|---|---|
| (1) 1.3-dimethyl-5-amino-2-chlorobenzene. | 2.3-hydroxynaphthoic acid-α-naphthylamide. | Vivid red. |
| (2) 1.3-dimethyl-5-amino-2-chlorobenzene. | 2.3-hydroxynaphthoic acid-4'-chloro-2'-methoxy-1' anilide. | Vivid scarlet. |
| (3) 1.3-dimethyl-5-amino-2-chlorobenzene. | 2.3-hydroxynaphthoic acid-4'-methoxy-1'-anilide. | Bluish-red. |
| (4) " | 2.3-hydroxynaphthoic acid-2'.5'-dimethoxy-1'-anilide. | Vivid yellowish-red. |
| (5) " | Diacetoacetic-3.3'-dimethyl-diphenyl-4.4'-diamide. | Bright reddish-yellow. |
| (6) 1.3-dimethyl-5-amino-2-bromo-benzene. | 2.3-hydroxynaphthoic acid-2'-methyl-1'-anilide. | Vivid red. |

| Diazotizing base | Coupled with | Shade of the dyeing produced on the fiber |
|---|---|---|
| (7) 1.3-dimethyl-5-amino-2-bromo-benzene. | 2.3 - hydroxynaphthoic-β-naphthylamide. | Vivid red. |
| (8) " | 2.3-hydroxynaphthoic acid - α - naphthylamide. | Bluish-red. |
| (9) 1.3 - dimethyl - 5-amino - 4 - chlorobenzene. | 2.3 - hydroxynaphthoic acid-2'-5'-dimethoxy-1'-anilide. | Vivid scarlet. |
| (10) " | Di - (2.3 - h y d r o x y-naphthoic acid)-3'.3''-dimethoxy-diphenyl-4'.4'' - diamide. | Reddish-brown. |
| (11) " | 2.3 - hydroxynaphthoic acid - 4' - methoxy -1'-anilide. | Vivid yellowish-scarlet. |
| (12) 1.3 - dimethyl -5-amino - 4 - bromobenzene. | Diacetoacetic - 3.3' - di methyl-diphenyl-4.4'-diamide. | Vivid reddish-yellow. |
| (13) " | 2.3 - hydroxynaphthoic acid - β - naphthylamide. | Vivid red. |
| (14) 1.3 - dimethyl - 5-amino - 2.4 - dichlorobenzene. | 2.3 - hydroxynaphthoic acid - 4' - methoxy -1'-anilide. | Vivid red. |
| (15) " | 2.3 - hydroxynaphthoic acid - 4' - chloro - 2'-methoxy-1'-anilide. | Vivid scarlet. |
| (16) " | 2.3 - hydroxynaphthoic acid-β-naphthylamide. | Vivid red. |
| (17) 1.3 - dimethyl - 5-amino - 4.6 - dichlorobenzene. | 2.3 - hydroxynaphthoic acid-2'.5'-dimethoxy-1'-anilide. | Vivid reddish-orange. |
| (18) 1.3 - dimethyl - 5-amino - 4.6 - dichlorobenzene. | Diacetoacetic - 3.3'-dimethyl - diphenyl-4.4'-diamide. | Vivid reddish-yellow. |
| (19) 1.3 - dimethyl - 5-amino-2.4.6-trichlorobenzene. | Di - (2.3 - hydroxynaphthoic acid) - 3'.3'' - dimethoxy - diphenyl-4'.4'''-diamide. | Reddish-brown. |
| (20) 1.3 - dimethyl -5-amino - 2.4.6 - tribromobenzene. | 2.3 - hydroxynaphthoic acid - 4' - methoxy - 1'-anilide. | Vivid scarlet. |

The bases named in the above examples, which, with the only exception of 1.3-dimethyl-5-amino-4-chlorobenzene and 1.3-dimethyl-5-amino-2.4.6-tribromobenzene have not yet been described in the pertaining literature, can be prepared according to the usual methods and have the following properties:

1.3-dimethyl-5-amino-2-chlorobenzene, recrystallized from petroleum ether, forms long, thin, hard needles, being colorless and melting at 58° C.–59° C., being easily volatile with water vapor and very readily soluble in an organic solvent.

1.3-dimethyl-5-amino-2-bromobenzene recrystallized from petroleum ether, forms long, felted, colorless needles, melting at 66° C.–67° C., being easily volatile with water vapor and readily soluble in an organic solvent.

1.3-dimethyl-5-amino-4-bromobenzene, is a colorless oil, boiling at 261° C.–263° C. under atmospheric pressure, solidifying on cooling into white needles, melting again at 27° C.–28° C. It is easily volatile with water vapor and readily soluble in an organic solvent.

1.3-dimethyl-5-amino-2.4-dichlorobenzene, recrystallized from petroleum ether, forms loose white needles, melting at 71° C.–72° C., being volatile with water vapor and readily soluble in an organic solvent.

1.3-dimethyl-5-amino-4.6-dichlorobenzene, recrystallized from petroleum ether, forms long, white needles, melting at 88° C.–90° C. It is volatile with water vapor and readily soluble in an organic solvent.

1.3-dimethyl-5-amino-2.4.6-trichlorobenzene recrystallized from alcohol, forms brown, fine needles, melting at 188° C.–189° C. It is difficultly volatile with water vapor, scarcely soluble in petroleum ether and ligroine, readily soluble in hot alcohol, but scarcely soluble in cold alcohol and readily soluble in acetone and ether.

1.3-dimethyl-5-amino-2-bromo-4-chlorobenzene, recrystallized from petroleum ether forms long, white needles, melting at 70° C.–72° C., being volatile with water vapor, readily soluble in an organic solvent.

1.3-dimethyl-5-amino-2-chloro-4-bromo-benzene, recrystallized from petroleum ether, forms white needles, melting at 79° C.–80° C. It is volatile with water vapor and readily soluble in an organic solvent.

1.3-dimethyl-5-amino-2.4-dibromobenzene, recrystallized from petroleum ether, forms white needles, melting at 81° C.–82° C. It is volatile with water vapor and readily soluble in an organic solvent.

1.3-dimethyl-5-amino-2.4-dibromo-6-chlorobenzene, recrystallized from alcohol, forms long, white needles, melting at 183° C.–186° C., readily soluble in an organic solvent.

Since an object of the present invention is to provide dyestuffs of good fastness properties, which dyestuffs are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are for instance, the sulfonic acid and the carboxylic acid group.

We claim:
1. As new compounds, azo dyestuffs of the following formula:

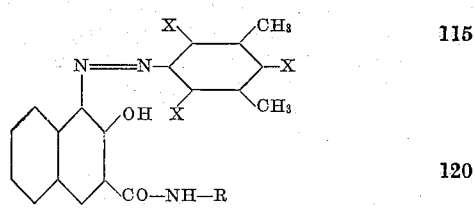

wherein at least one X stands for halogen, the other X's represent hydrogen or halogen, R represents a residue of the benzene or naphthalene series, said dyestuffs being insoluble in water, dyeing yellow to bluish-red tints of good fastness to kier-boiling, to chlorine and to light.

2. As new compounds, azo dyestuffs of the following formula:

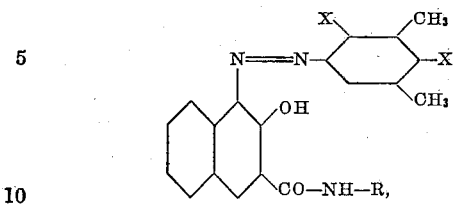

wherein one X stands for halogen, the other X for hydrogen or halogen and R represents a residue of the benzene or naphthalene series, said dyestuffs being insoluble in water, dyeing yellow to bluish-red tints of good fastness to kier-boiling, to chlorine and to light.

3. As a new product, the azo dyestuff of the following formula:

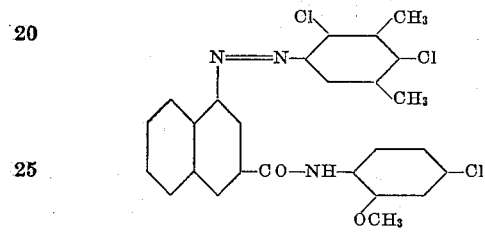

said dyestuff being water-insoluble, dyeing scarlet tints of good fastness to kier-boiling, to chlorine and to light.

4. Fiber dyed with dyestuffs as claimed in claim 1.

5. Fiber dyed with dyestuffs as claimed in claim 2.

6. Fiber dyed with the dyestuff as claimed in claim 3.

7. As new compounds, azo dyestuffs of the following formula:

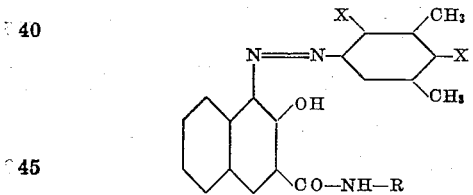

wherein one X stands for halogen, the other X for hydrogen or halogen and R represents a residue of the benzene series, said dyestuffs being insoluble in water, dyeing yellow to bluish-red tints of good fastness to kier-boiling, to chlorine and to light.

8. Fiber dyed with dyestuffs as claimed in claim 7.

9. As a new product, the azo dyestuff of the following formula:

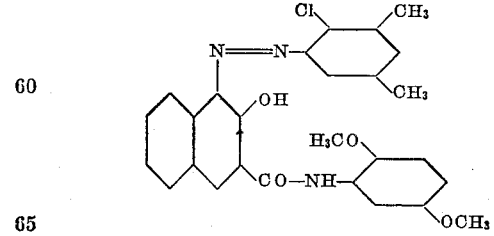

said dyestuff being water-insoluble, dyeing vivid scarlet tints of good fastness to kier-boiling, to chlorine and to light.

10. As a new product, the azo dyestuff of the following formula:

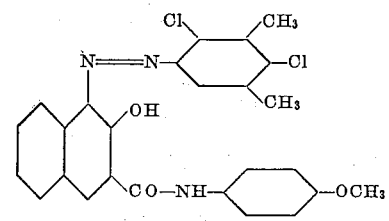

said dyestuff being water-insoluble, dyeing vivid red tints of good fastness to kier-boiling, to chlorine and to light.

11. Fiber dyed with the dyestuff as claimed in claim 9.

12. Fiber dyed with the dyestuff as claimed in claim 10.

In testimony whereof, we affix our signatures.

HERBERT KRACKER.
ERWIN THOMA.